(12) United States Patent
Ries-Mueller

(10) Patent No.: US 6,606,550 B1
(45) Date of Patent: Aug. 12, 2003

(54) DEVICE FOR CONTROLLING AN INTERNAL COMBUSTION ENGINE

(75) Inventor: Klaus Ries-Mueller, Bad Rappenau (DE)

(73) Assignee: Robert Bosch GmbH, Stuttgart (DE)

( * ) Notice: Subject to any disclaimer, the term of this patent is extended or adjusted under 35 U.S.C. 154(b) by 97 days.

(21) Appl. No.: 09/641,877

(22) Filed: Aug. 17, 2000

(30) Foreign Application Priority Data

Mar. 28, 2000 (DE) .......................... 100 15 319

(51) Int. Cl.⁷ ............................................. G01M 15/00
(52) U.S. Cl. ..................... 701/114; 701/35; 701/115
(58) Field of Search ............................. 701/114, 115, 701/33, 35; 73/117.3; 340/438, 459

(56) References Cited

U.S. PATENT DOCUMENTS 5,111,686 A * 5/1992 Kamiya et al. ............ 73/117.3
5,311,430 A * 5/1994 Ishigami ...................... 701/35
5,581,464 A * 12/1996 Woll et al. .................... 701/35

FOREIGN PATENT DOCUMENTS

| DE | 40 40 927 | 6/1992 |
| DE | 195 09 711 | 9/1995 |
| DE | 195 46 815 | 6/1997 |
| DE | 196 49 484 | 6/1998 |
| DE | 198 49 328 | 5/2000 |

* cited by examiner

Primary Examiner—Andrew M. Dolinar
(74) Attorney, Agent, or Firm—Kenyon & Kenyon

(57) ABSTRACT

A device for controlling an internal combustion engine is described. The device includes a storage device, in which data or quantities, existing in each case at earlier points in time, are continually stored; and when a predefined condition is met, these data or quantities are successively overwritten, in each case, by data or quantities existing, in each case, at later points in time. In response to the occurrence of a predefined event, the data or quantities stored in the storage device, being permanently stored. The predefined event is an improper operation of the vehicle.

10 Claims, 2 Drawing Sheets

DEVICE FOR CONTROLLING AN INTERNAL COMBUSTION ENGINE

FIELD OF THE INVENTION

The present invention relates to a device for controlling an internal combustion engine.

BACKGROUND INFORMATION

German Patent Application No. DE-OS 40 409 27 describes a device for controlling an internal combustion engine which stores errors in a control device of a motor vehicle. If the control device recognizes an error, the instantaneous operating conditions are stored.

A device for controlling an internal combustion engine is described in German Patent Application No. DE 198 49 328. In response to the occurrence of an error, at least one value of a quantity is stored in a fault memory. At the least, the value of that quantity, which existed at a point in time prior to the occurrence of the error, is stored in the fault memory.

Both devices utilize the occurrence of an error as a criterion which prompts the quantities to be stored. No mention is made of considering another criterion.

A control system having data storage is described in German Patent Application No. 195 46 815. The control system is an engine-control unit, which contains a memory unit. Stored in this memory unit are data, which are supplied to the engine-control unit as data originating from the sensory mechanism allocated to the unit. Moreover, various data are supplied from a brake-slip control contained in the vehicle to the memory unit located in the engine-control unit. In response to a crash sensor detecting the occurrence of an accident, the data stored in a previous time period are permanently stored.

SUMMARY

An object of the present invention is to provide a device for controlling an internal combustion engine where data or quantities are also stored in response to other events, such as errors or accidents. In this context, data or quantities are stored in response to an improper vehicle operation.

According to the present invention, a device for controlling an internal combustion engine is provided which includes a storage device in which data or quantities, existing in each case at earlier points in time, are continually stored. When a predefined condition is met, these data or quantities are successively overwritten, in each case, by data or quantities existing, in each case, at later points in time. In response to the occurrence of a predefined event, the data or quantities stored in the storage device, are permanently stored.

In accordance with the present invention, the predefined event is an improper operation of the vehicle.

Improper operation, in the sense of the present invention, is understood as follows:

By actuating the accelerator, the brake pedal, and the steering wheel, the driver adjusts the vehicle's driving condition. This driving condition is defined by various parameters and/or quantities. Cited here, by way of example, are engine speed, vehicular speed or transversal dynamic quantities.

As long as the parameters, derived from actuation of the accelerator, the brake pedal, or the steering wheel, such as engine speed or vehicle deceleration, are within predefined limits; or, as long as these parameters are plausible, in view of certain marginal conditions, then there is proper operation of the vehicle.

On the other hand, there is improper operation of the vehicle when the resulting parameters are no longer within predefined limits, or exceed or fall below predefined limits. This is the case, for example, when the engine speed exceeds a predefined value. One can distinguish here between a shorter or longer period of time, the latter case being the more serious one.

Another case is when the internal combustion engine is operated in spite of an empty or substantially empty tank. This situation can be determined on the basis of a quantity describing the filling level of the tank, or on the basis of a quantity describing the residual amount of fuel in the tank.

Another case of improper operation—the parameters are implausible in view of certain marginal conditions—exists, for example, in the following situations:

The internal combustion engine is operated at high speeds in a cold state. In spite of the fact that fault situations are indicated, for example by trouble localizer lights or acoustic signals, vehicle operation continues. This is the case, for example, when indicators warn of too high of an engine temperature, too low of an oil pressure, or of an error or defect in the braking system.

The use of program memory modules, e.g., E-PROMS, which permit a modified operation of the internal combustion engine, can also be detected. This manipulation, known as chip tuning, can potentially result in lasting damage to the vehicle's transmission, since the transmission is loaded with a torque greater than that which is maximally allowed. In this case, the predefined event does exist, for example, when engine parameters lie above predefined values, which represent maximum values.

Along the lines of the present invention, an accident or an accident event is not to be understood as improper operation.

In response to improper operation of the vehicle, data or quantities are permanently stored, enabling them to be used in a potential later warranty claim.

Improper operation is advantageously recognized when the engine speed falls below a predefined value, for a predefined period of time. In such an operating state, there is the possibility that the internal combustion engine is affected. For that reason, it is important that such operating states be registered in the case of damage, in view of a potential warranty claim. Alternatively or additionally, improper operation is recognized, when it is ascertained that the internal combustion is being operated in spite of an empty or substantially empty tank. Furthermore, an operating state can also exist where combustion misses occur due to a defect. Typically, a flashing trouble localizer light signals this to the driver. Operating states of this kind can also affect the catalytic converter. In this connection, reference is made to German Patent Application DE 196 49 484 which describes this problem and a method for detecting disturbances caused by an empty tank in the case of an internal combustion engine. The entire disclosure of German DE 196 49 484 is expressly incorporated herein by reference.

A second predefined event, in this context, an accident, is also advantageously considered. In addition, permanently storing the data or quantities in response to the occurrence of an accident makes it possible to reconstruct the accident event afterwards and, possibly, clear up any unsettled question of guilt. An accident is advantageously recognized when an occupant-restraint system contained in the vehicle is triggered, and/or when the longitudinal acceleration, and/or the transversal acceleration of the vehicle is greater than predefined threshold values. The occupant-restraint system is advantageously an airbag system.

The predefined condition is advantageously met when all or a percentage of the storage device's memory space is occupied. As can be easily recognized, this condition depends, on the one hand, on the memory space that the storage device makes available, or on the volume of data to be stored at any one time. When all of the memory space is occupied, data or quantities can no longer be stored after a predefined event occurs. On the other hand, the other condition, which is then met when a certain percentage of the memory space is occupied, has the decisive advantage that data or quantities can always still be stored after the predefined event occurs, due to the still available memory space.

The data or quantities stored in the storage device are advantageously input quantities, which are supplied to the device, or quantities, which are determined in the device within the context of internal combustion engine control. The data or quantities include, for example, vehicular speed, and/or wheel speeds, and/or engine speed, and or a load signal, and/or quantities describing a brake actuation, and/or the time of day, and/or the vehicle's location, given the presence of a vehicle navigation system. It is also possible, however, to likewise store diagnostic and adaptation parameters describing the status of a vehicle component. Thus, for example, the catalytic converter status, ordinarily determined in an engine management system, can be stored as well. This enables one to clearly verify damage caused, for example, from driving with a nearly empty tank. In addition, in this connection, it is advantageous to record excerpts from the fault memory, i.e., recognized errors, such as diagnostic and/or adaptation parameters, which produce signals or quantities indicating, for example, the duration of use of individual components, or the wear they are subject to, or indicating whether the sensory mechanism or other components are functioning correctly, i.e.. are not impaired in their functioning.

The storage device is advantageously a ring-type memory, i.e., the storage device is designed or organized as a ring-type memory, i.e., is addressed accordingly. The advantage of a ring-type memory is that the data or quantities are stored in it on a circulating basis. In other words, as long as the memory is not yet completely written, for example, data or quantities continue to be stored in it. As soon as the memory is completely written, the data or quantities first stored in it are overwritten by the most recent data or quantities. In this procedure, the old data are successively replaced by newer data or quantities, with the oldest data or quantities always being replaced first.

The data or quantities contained in the storage device are advantageously transferred to an external evaluation device. Thus, the data or quantities stored in the storage device, can be analyzed, for example, at any time with little outlay.

It is especially beneficial when the storage device is an integrated memory module, in which data or quantities are able to be stored as volatile and non-volatile data. Here, it is a question, in particular, of an integrated semiconductor module. When an integrated memory module is used, it is easy and entails little outlay to integrate the storage device in the device to influence the first vehicle quantity.

The storage device is advantageously a component of a device for detecting errors or for monitoring functioning. As a result, a further benefit is derived from data or quantities produced in the memory device also being stored in this device.

Another benefit is derived from the storage device being contained in the device for controlling the internal combustion engine, i.e., from this storage device already being present or inserted in this device. This eliminates the need for installing a separate accident-data recorder later on. The result is substantially lower costs for the vehicle owner.

The non-volatile storing of data or quantities ensures that the data or quantities already contained in the storage device are no longer overwritten by the more recent data or quantities, i.e., the data or quantities already contained in the storage device are "frozen".

In comparison with the accident-data recorder described in German Patent Application No. 195 09 711, another advantage of the device in accordance with the present invention is that there is no need to accommodate a separate unit in the vehicle, since the function of storing data is integrated in the device for controlling the internal combustion engine. At the same time, this means that fewer costs accrue for the vehicle owner, since he or she has no need for a separate accident-data recorder.

The storage of the data or quantities is advantageously organized in such a way that a plurality of instances of improper operation are recorded, i.e., retained, without the first recorded data being overwritten, i.e., lost. In this manner, it can be determined over an extended period of time whether improper operation is occurring more often. For this purpose, once improper operation has occurred, a portion of the memory space of the storage device is blocked for the rolling-type storage of subsequent data or quantities, i.e., once improper operation exists, the rolling-type storage is implemented with the aid of a memory space that is reduced in volume.

DETAILED DESCRIPTION

The procedure in accordance with the present invention is described in the following on the basis of a control unit. Control units of this kind are used, in particular, for controlling an internal combustion engine in a vehicle. However, such control units are also used to control other variables in motor vehicles. Provision can be made, for example, for the braking action of a single wheel or of a plurality of wheels to be influenced as a function of the vehicle's driving status and/or of the driver's command.

Figure 1:
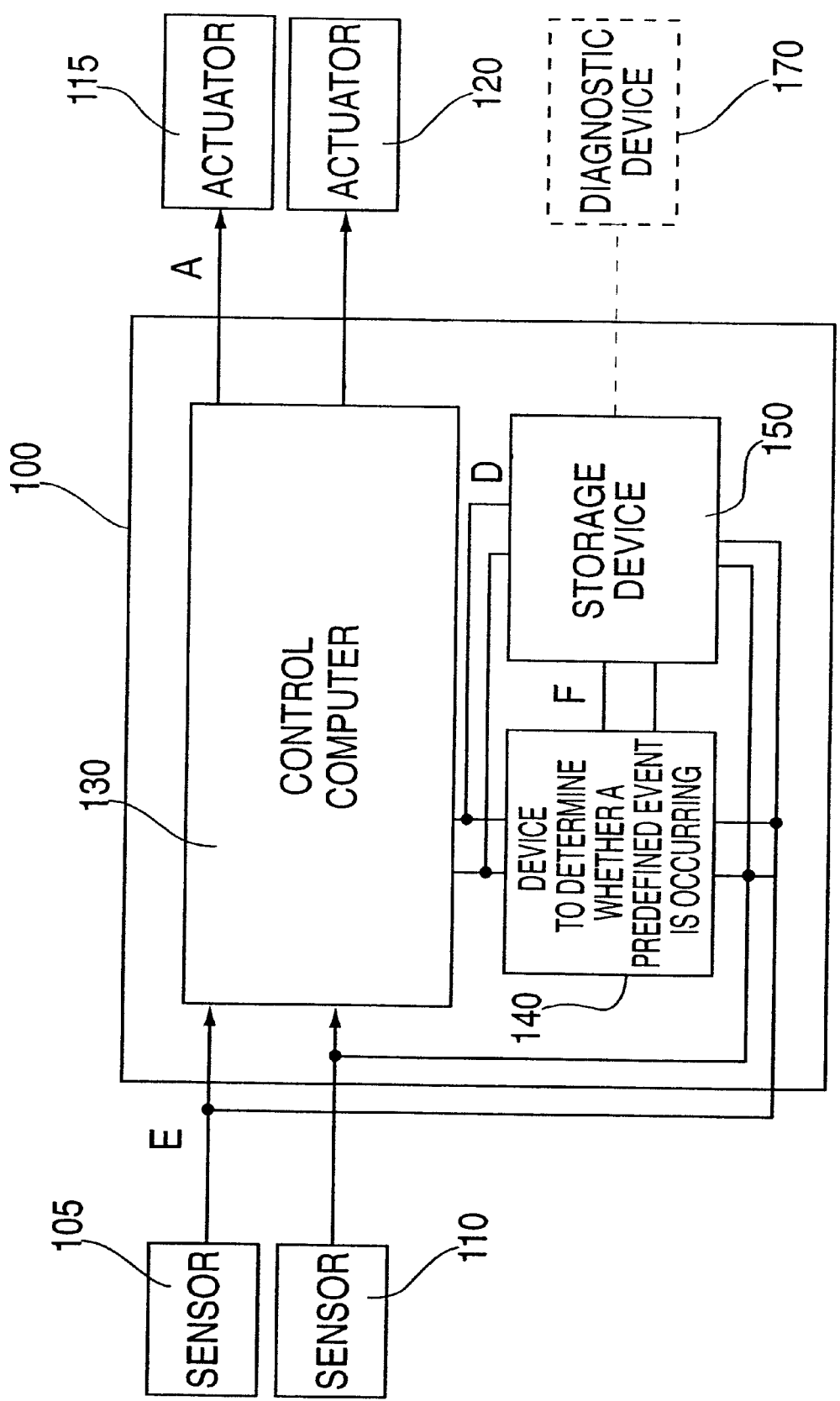
FIG. 1 shows an example embodiment of a device in accordance with the present invention for controlling the internal combustion engine.

In FIG. 1, 100 denotes such a control device. The control device includes a control computer 130, which is linked to a device 140 used to determine whether a predefined event is occurring. The predefined event is, first, an improper operation of the vehicle and, second, an accident. Device 140 is linked via various lines F to a storage device 150. The output signals E from various sensors 105 and 110 are fed to control device 100. Various actuators 115 and 120 receive drive input (trigger) signals A from the control device. In this context, sensors 105 and 110 are assigned as follows: on the basis of the quantities they detect, sensors 105 are assigned to the device for controlling the internal combustion engine. Sensors 110 are either assigned to other devices contained in the vehicle for influencing other vehicle quantities, or they are configured, for example, in an occupant-restraint system, in particular in an airbag system.

A diagnostic device 170 is able to be linked for a time with the control device, in particular with storage device 150, as indicated by a dotted line.

The number of sensors and the number of actuators can assume any desired values. To maintain its functioning, the control device includes control computer 130, which is provided, first, with output signals E from sensors 105. To the extent that it is beneficial, output signals E from sensors 110 are also made available, at least partially, to control computer 130. The actuators receive the appropriate drive input signals A from the control computer. Control computers of this kind are conventional and are used to control diverse variables in motor vehicles.

Sensors 105 are, for example, those sensors used for detecting engine speed and/or load signals. Sensors 110 are, for example, those sensors used for detecting vehicular speed and/or wheel speeds and/or the quantities which describe a brake actuation. In addition, sensors 110 can also include acceleration sensors for detecting acceleration in the longitudinal and/or transversal directions.

Device 140 is supplied with output signals E from sensors 105 or 110, as well as with quantities D, which are produced in the control computer within the context of internal combustion engine control. Quantities D are, for example, drive input signals A for actuators 115 and 120, as well as various internal quantities of control computer 130 or of control device 100. Device 140, which can also be integrated in control computer 130, analyzes signals E or quantities D supplied to it, and, on the basis of these signals or quantities, recognizes whether a predefined event is occurring or not.

Storage device 150 is also supplied with signals E and quantities D, in a manner comparable to device 140. Both signals E, as well as quantities D are stored in storage device 150. The storage process proceeds in the following manner: the data or quantities which existed in each case at earlier points in time are continually stored. When a predefined condition is met, they are overwritten, in succession, by data or quantities existing in each case at later points in time, the data or quantities stored in the storage device being permanently stored in response to the occurrence of a predefined event. The data or quantities can be stored in storage device 150 in a specified time grid.

If a predefined event is recognized in device 140, a signal F to this effect is then transmitted to storage device 150. The data or quantities, contained, though possibly merely as volatile data or quantities, in storage device 150, are then permanently stored, i.e., stored as non-volatile data. The non-volatile storing of data or quantities ensures that the data or quantities already contained in the storage device are no longer overwritten by the more recent data or quantities, i.e., the data or quantities already contained in the storage device are "frozen".

A diagnostic device 170, which is able to be linked for a time with the control device 100 in order to read out the contents of storage device 150, is indicated by dotted lines.

Other quantities or data, which can be stored in storage device 150, include the instant of start of injection, of the end of injection, the duration of injection, the injection pressure, as well as other quantities characterizing the operating state of the internal combustion engine. Also included is the fuel pressure.

When working with control devices which control other systems in an internal combustion engine, other relevant quantities can be stored].

Figure 2:
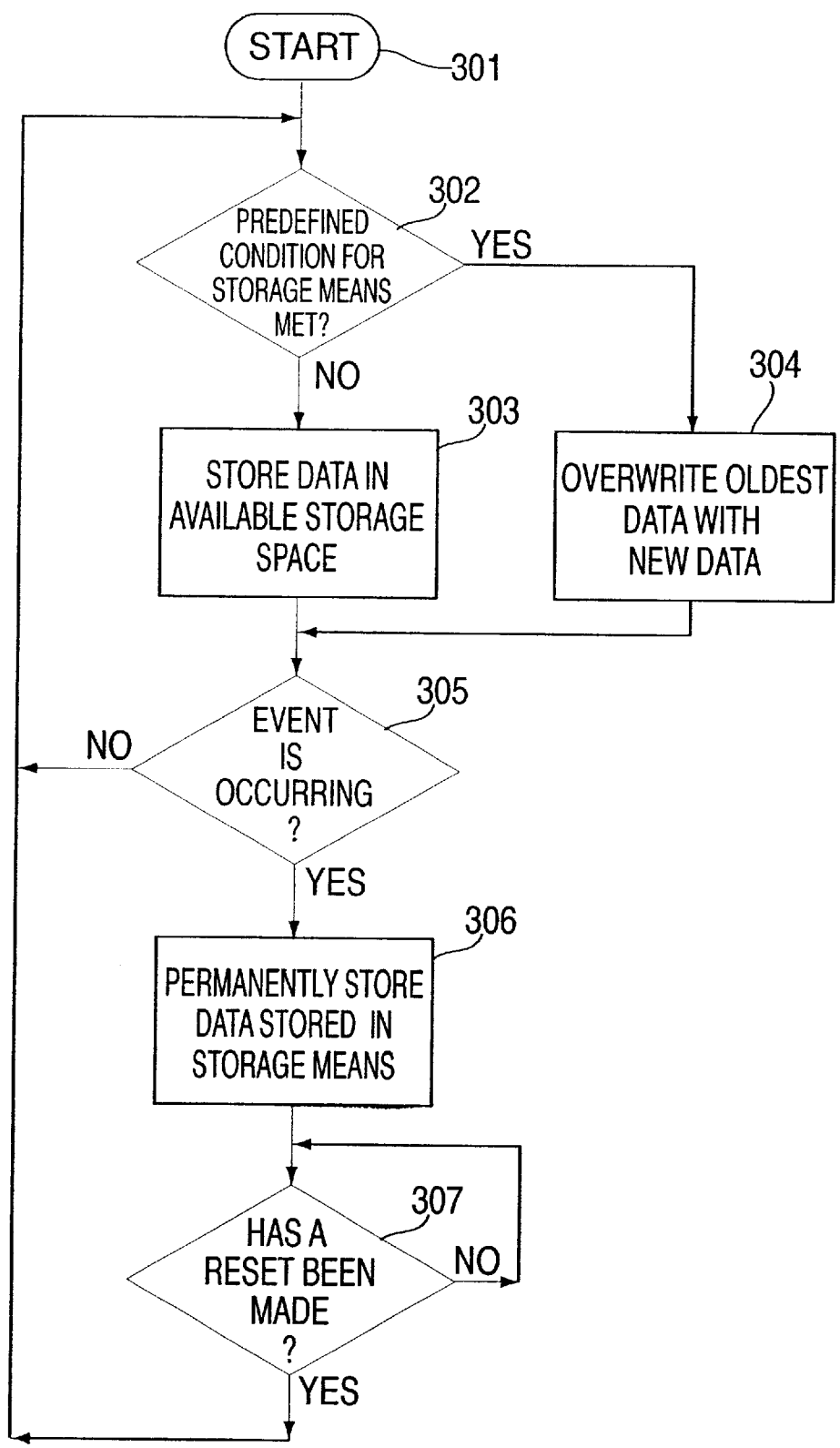
FIG. 2 show a flow chart which illustrates the functional sequence of the procedure being executed in the device in accordance with the present invention.

FIG. 2 illustrates the functional sequence of the procedure being executed in device 100. The procedure begins with a step 301. Following step 301, step 302 is executed. In this step, it is checked whether it predefined condition is fulfilled for the storage device. In the specific case, it is checked whether all or a percentage of the memory space of the storage device is occupied. If this is not the case, following step 302, a step 303 is performed, in which data E or quantities D fed to the storage device are stored in an available memory space. Following step 303, a step 305 is executed.

If, on the other hand, it is ascertained in step 302 that the predefined condition for the storage device is met, then, following step 302, a step 304 is executed, in which the oldest data or quantities contained in the storage device are overwritten by the newest data or quantities. In other words: the data or quantities existing at earlier points in time, which had been continuously stored, are now successively overwritten by data or quantities existing, in each case, at later points in time. Following step 304, step 305 is likewise executed.

Step 305 checks to determine whether a predefined event is occurring. In the specific case, it checks, first, whether the vehicle is being improperly operated or, in the second case, whether an accident is at hand. The occurrence of an accident can, for example, be ascertained by analyzing the vehicle's acceleration in the longitudinal and/or transversal directions. An accident exists, in particular, when the vehicle's longitudinal and/or transversal accelerations are greater than predefined threshold values. An accident is also recognized by the triggering of an occupant-restraint system contained in the vehicle.

Improper operation is recognized when the engine speed exceeds a predefined value for a preset period of time, or when it is ascertained that the internal combustion engine is being operated in spite of an empty tank or a substantially empty tank.

There is also improper operation when the driver does not react or reacts incorrectly to trouble localizer lights. An example is continuing to drive at full throttle when indicators point to too high of an engine temperature or insufficient oil pressure.

If the predefined event is not occurring, then, following step 305, step 302 is executed once again, i.e., data or quantities continue to be written into or stored in the storage device. If, on the other hand, the predefined event is occurring, then, following step 305, a step 306 is executed.

In step 306, the data or quantities located in storage device 150 are permanently stored, i.e. as non-volatile data. In other words: the data or quantities are frozen; they are retained; older data or quantities are not overwritten by more recent data.

Reference is made at this point to the following: in connection with step 302, two conditions are introduced for storage device 150. The first is the condition where it is determined whether the memory space of storage device 150 is completely occupied. If this condition underlies the query in step 302, then, following the determination in step 305 that the predefined event is occurring, no more data or quantities can be stored in storage device 150, since no more memory space is available. On the other hand, in step 302, the condition can be analyzed, where it is queried whether a certain percentage of the memory space of storage device 150 is occupied. When this query is used, it is for the case that the predefined event is at hand, and it is still possible to store data or quantities in storage device 150 which had been generated following the instant in time when the predefined event was introduced. This means in this case, for example following an accident, that it is still possible to store data. Thus, even the situation following the accident can still be documented.

Following step 306, a step 307 is executed. In step 307, it is queried as to whether a reset was made for storage device 150. If it is ascertained in step 307 that no reset was made, which is synonymous with the requirement for the data or quantities to remain stored in storage device 150, then step 307 is executed again. If, on the other hand, it is ascertained in step 307 that a reset was performed, which is synonymous with the requirement for the data or quantities stored in storage device 150 to be erased, then, following step 307, step 302 is performed once again.

Step 307 is optional. One can also eliminate the query being made in step 307. In addition, it may be beneficial to insert an additional query, conforming to that of step 307, between steps 301 and 302.

In conclusion, the form of the exemplary embodiment selected in the description, as well as the representation selected in the figures, are in no way intended to restrict the underlying idea of the present invention.

What is claimed is:

1. A device for controlling an internal combustion engine, comprising:

an integrated storage device in which data or quantities existing at early points in time are continually stored, the data or quantities being successively overwritten when a predefined condition is met by data or quantities existing at later points in time, wherein in response to an occurrence of a predefined event, the data or quantities stored in the storage device are permanently stored, the predefined event being an improper operation of a vehicle, wherein the improper operation is recognized when an engine speed exceeds a predefined value for a preset period of time, or at least one of: i) when it is ascertained that the internal combustion engine is being operated in spite of an empty tank or a substantially empty tank, and ii) when, in spite of indicators indicating a fault condition, the internal combustion engine is being operated.

2. The device according to claim 1, wherein a second predefined event is considered, the second predefined event being an accident, which is detected at least one of: i) when an occupant-restraint system contained in the vehicle is triggered, ii) when a longitudinal acceleration is greater than a first predefined threshold value, and iii) when a transversal acceleration of the vehicle is greater than a second predefined threshold value.

3. The device according to claim 1, wherein the predefined condition is met when all or a percentage of a memory space of the storage device is occupied.

4. The device according to claim 1, wherein the data or quantities stored in the storage device are one of: i) input quantities, which are supplied to the storage device, and ii) quantities which are determined within the context of internal combustion engine control.

5. The device according to claim 1, wherein the data or quantities include at least one of: i) vehicular speed, ii) wheel speeds, iii) engine speed, iv) a load signal, v) quantities describing a brake actuation, vi) a time of day, vii) diagnostic parameters which describe a status of vehicle components, and viii) adaptation parameters which describe the status of vehicle components.

6. The device according to claim 1, wherein the storage device is a ring-type memory, in which the data or quantities are stored on a circulating basis.

7. The device according to claim 1, wherein the data or quantities stored in the storage device are transferred to an external evaluation device.

8. The device according to claim 1, wherein the storage device is a component of one of: i) an error detecting device, and ii) a monitoring device that monitors functions.

9. The device according to claim 3, wherein data or quantities produced in the course of an error detection or function monitoring are also stored in the storage device.

10. A device for controlling an internal combustion engine, comprising:

an integrated storage device in which data or quantities existing at early points in time are continually stored, the data or quantities being successively overwritten when a predefined condition is met by data or quantities existing at later points in time, wherein in response to an occurrence of a predefined event, the data or quantities stored in the storage device are permanently stored, the predefined event being an improper operation of a vehicle, wherein the improper operation is recognized when an engine speed exceeds a predefined value for a preset period of time, or at least one of: i) when it is ascertained that the internal combustion engine is being operated in spite of an empty tank or a substantially empty tank, and ii) when, in spite of indicators indicating a fault condition, the internal combustion engine is being operated; and wherein the indicators include at least one of a trouble localizer and an acoustic signal.

\* \* \* \* \*